(12) United States Patent
Chen et al.

(10) Patent No.: US 7,709,760 B2
(45) Date of Patent: May 4, 2010

(54) LIGHT-EMITTING KEYBOARD

(75) Inventors: Tsung-Min Chen, Taipei Hsien (TW); Chun-Lin Chen, Taipei Hsien (TW); Cheng-Hsiung Huang, Taipei Hsien (TW); Chien-Shuo Chen, Taipei Hsien (TW)

(73) Assignee: Chicony Electronics Co., Ltd., Taipei Hsien (TW)

( * ) Notice: Subject to any disclaimer, the term of this patent is extended or adjusted under 35 U.S.C. 154(b) by 0 days.

(21) Appl. No.: 12/314,801

(22) Filed: Dec. 17, 2008

(65) Prior Publication Data

US 2009/0283393 A1 Nov. 19, 2009

(30) Foreign Application Priority Data

May 13, 2008 (TW) .............................. 97117521 A

(51) Int. Cl.
*H01H 13/83* (2006.01)
(52) U.S. Cl. ........................ 200/314; 200/310; 200/317; 200/344
(58) Field of Classification Search .................. 200/310, 200/314, 317, 341, 344, 517; 400/490–496
See application file for complete search history.

(56) References Cited

U.S. PATENT DOCUMENTS

| 6,860,612 | B2* | 3/2005 | Chiang et al. ................. 362/29 |
| 7,057,125 | B1* | 6/2006 | Tsai ............................ 200/310 |
| 7,154,059 | B2* | 12/2006 | Chou .......................... 200/314 |
| 7,232,969 | B1* | 6/2007 | Hsu et al. .................... 200/310 |
| 7,351,928 | B2* | 4/2008 | Harada ..................... 200/302.1 |
| 7,388,167 | B2* | 6/2008 | Liao et al. ................... 200/310 |
| 7,446,275 | B2* | 11/2008 | Lee et al. .................... 200/314 |
| 7,525,056 | B2* | 4/2009 | Chiba et al. ................. 200/314 |
| 7,572,994 | B2* | 8/2009 | Jung .......................... 200/310 |
| 7,588,338 | B2* | 9/2009 | Chou .......................... 362/24 |

* cited by examiner

*Primary Examiner*—Michael A Friedhofer
(74) *Attorney, Agent, or Firm*—Bacon & Thomas, PLLC

(57) ABSTRACT

The present invention is related to a light-emitting keyboard, comprising: a light guide having a light entrance surface, a bottom surface and a light exit surface; a light source provided adjacent to the light entrance surface of the light guide; a first reflector disposed underneath the bottom surface of the light guide to reflect the light originated from the light source to enter into said light guide; a second reflector disposed on top of said light exit surface of the light guide; a membrane circuit board disposed on top of said second reflector, said membrane circuit board being provided with an elastic member; a supporting plate disposed on top of the membrane circuit board; a scissor assembly engaged with said supporting plate and provided thereon; and a keycap supported by said scissor assembly.

9 Claims, 3 Drawing Sheets

LIGHT-EMITTING KEYBOARD

BACKGROUND OF THE INVENTION

1. Field of the Invention

The present invention relates to a keyboard and in particular, to a light-emitting keyboard; said keyboard may be of lower manufacturing costs, greater luminance and effective circuit design with a more secure structure.

2. Description of the Related Art

With the popularity of computer, users not only pursue better computer efficiency but also pay more attention to the function and design of computer accessories such as mouse and keyboard. As computer has become an indispensable device in nearly every aspect of modern life from telecommunication, commerce, editing to graphics design, some manufacturers equip keyboard, one of the most important input devices for computer, with backlit keys so that the user can perform input tasks under inadequate lighting. Besides, the back lighting makes the keyboard look fancy.

Referring to the description on a light-emitting keyboard of ROC Publication No. 509955, the keyboard disposed on a bottom casing comprises: a base plate, with a plurality of fixations disposed thereon; a membrane circuit board; at least one keycap; at least one elastic member; and at least one scissor structure. An end of the scissor structure is connected to said plurality of fixations on the base plate while the other end thereof is connected to the keycap such that the keycap may move upwardly and downwardly relative to the base plate. Said at least one elastic member is disposed between the membrane circuit board and the keycap to support the keycap in an upward or vertical direction.

A shortcoming of the abovementioned prior keyboard exists in that as an end of the scissor structure is to be connected to at least one of the fixations on the base plate, said end of the scissor structure is, in fact, required to pass through openings on the membrane circuit board and then be connected to the fixations on the base plate. Such design and structure inevitably increase the number of openings required on the membrane circuit board to allow the respective ends of all the scissor structures to pass therethrough and also unfavorably cause an increase in the complexity of the design and layout of the circuit as well as the manufacturing costs of the keyboard.

Accordingly, there is a need for an improved light-emitting keyboard to overcome the shortcomings of the known art, in which a scissor structure of a keyboard is required to have an end thereof pass through the openings on a membrane circuit board, so as to simplify the connections between the scissor structure and the fixations on a base plate and to provide a keyboard that may, consequently, be of lower manufacturing costs and effective circuit design.

SUMMARY OF THE INVENTION

An objective of the present invention is to provide a light-emitting keyboard incorporating a scissor assembly whose lower ends are connected to a first and second fixation brackets of a supporting plate and whose upper ends are connected to the bottom of a keycap such that an elastic member of a membrane circuit board passes through a first opening of the supporting plate and the scissor assembly to engage with the bottom of said keycap. In one embodiment of the present invention, in comparison with prior arts, fewer openings or apertures may be found on the membrane circuit board of the keyboard, and this may significantly reduce the complexity of the design and layout of the circuit board as well as the manufacturing costs of the keyboard.

Another objective of the present invention is to provide a light-emitting keyboard of greater luminance. In one embodiment of the present invention, a light-emitting keyboard may be further provided with a first reflector and a second reflector to enhance the reflection and retroreflection of the light and thus the light emitting capability and efficiency of the light-emitting keyboard.

In a preferred embodiment of the present invention, a light-emitting keyboard comprises: a light guide having a light entrance surface, a bottom surface and a light exit surface; a light source provided on one side of the light entrance surface; a first reflector provided underneath the bottom surface of the light guide to prevent the light emitted by the light source from escaping from the bottom surface of the light guide by reflecting said light towards the light exit surface of the light guide; a second reflector provided on top of the light exit surface; a membrane circuit board having an elastic member provided on top of the second reflector; a supporting plate provided on top of the membrane circuit board, said supporting plate further including a first opening corresponding to the elastic member of the membrane circuit board and at least one first fixation bracket and at least one second fixation bracket adjacent to the first opening thereon; and a scissor assembly disposed on and engaged with the supporting plate to support a keycap thereon; wherein the lower ends of the scissor assembly may be engaged with the first and second fixation brackets of the supporting plate respectively and the upper ends of the scissor assembly may be received at a bottom of the keycap; and wherein the elastic member of the membrane circuit board may pass through the first opening of the supporting plate and the scissor assembly to engage with the keycap. Furthermore, in one embodiment, said second reflector may permit a portion of the light originated from the light source to penetrate therethrough in a direction towards the bottom of the keycap and reflect another portion of the light originated from the light source back towards the light exit surface of the light guide.

A reinforcement board having at least one fastener may be further provided on top of the second reflector; and preferably it may be disposed between the membrane circuit board and the second reflector.

It is preferable that a water-resistant layer may be further provided on top of the second reflector; and preferably, it may be disposed between the membrane circuit board and the second reflector such that the light-emitting keyboard may be protected from infiltrated liquid.

It is preferable that at least one fastener aperture is configured on the membrane circuit board and the supporting plate respectively, allowing the at least one fastener of the reinforcement board to pass therethrough such that the reinforcement board, the membrane circuit and the supporting plate may be secured in a stack.

It is preferable that a water-resistant layer may be provided on top of the second reflector; and preferably it is disposed between the second reflector and the light guide to protect the light-emitting keyboard from infiltrated liquid. In another preferred embodiment, the water-resistant layer may be provided underneath the second reflector, such as in a vertical direction; and preferably, it is disposed between the second reflector and the light guide.

It is preferable that the light source may be controlled by a base circuit board and be provided adjacent to a lateral side of the light guide. In another preferred embodiment, the light source may be controlled by the membrane circuit board.

It is preferable that the light entrance surface and the bottom surface of the light guide adjoin to each other and the bottom surface of the light guide is opposed to the light exit surface of the light guide such that the light originated from the light source may enter at the light entrance surface of the light guide and radiate out of the light guide via the light exit surface thereof.

DETAILED DESCRIPTION OF THE PREFERRED EMBODIMENTS

The present invention will be described more fully hereinafter with reference to the accompanying drawings, in which preferred embodiments of the invention are shown. This invention may, however, be embodied in many different forms and should not be construed as limitations to the embodiments set forth herein; rather, these embodiments are provided so that this disclosure will be thorough and complete, and will fully convey the scope of the invention to those skilled in the art.

Figure 1:
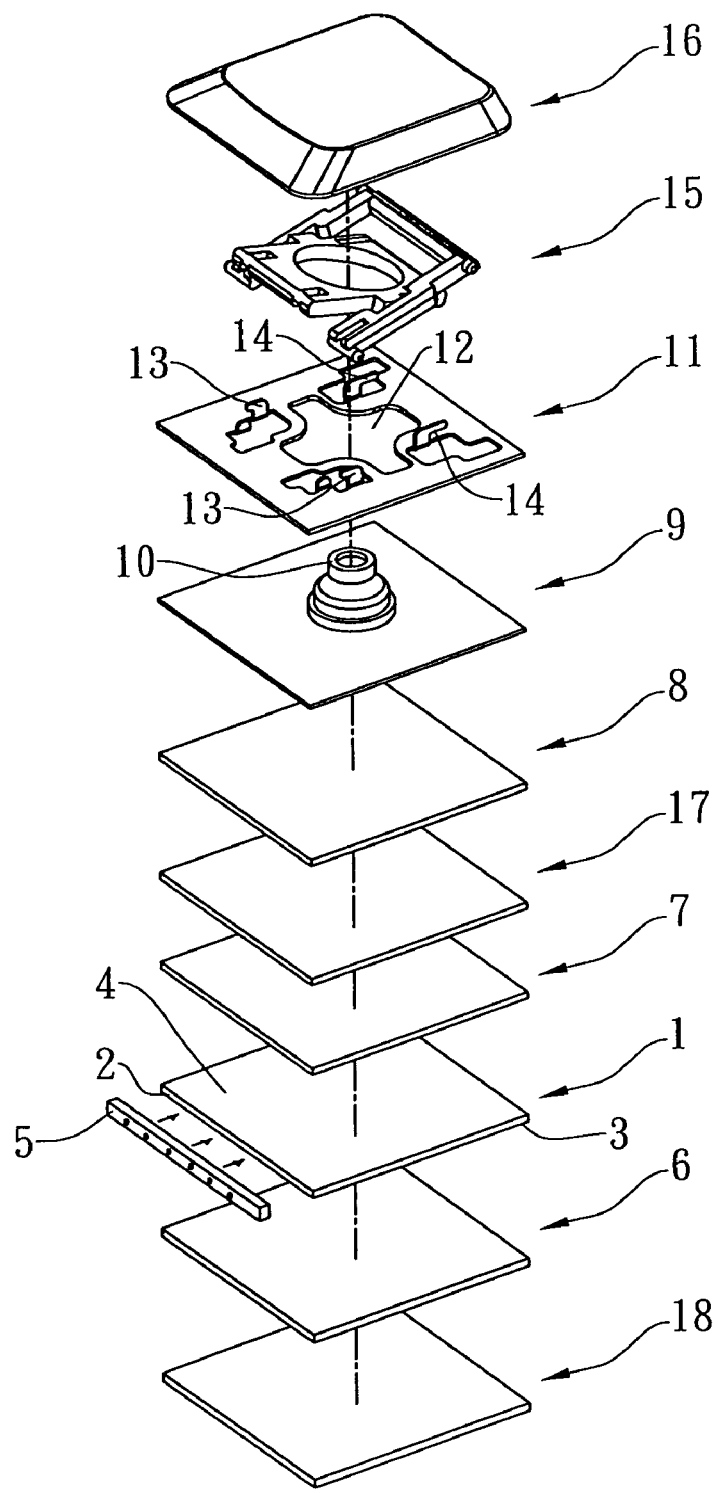
FIG. 1 is an exploded view representing a light-emitting keyboard according to a preferred embodiment of the present invention.
Figure 2:
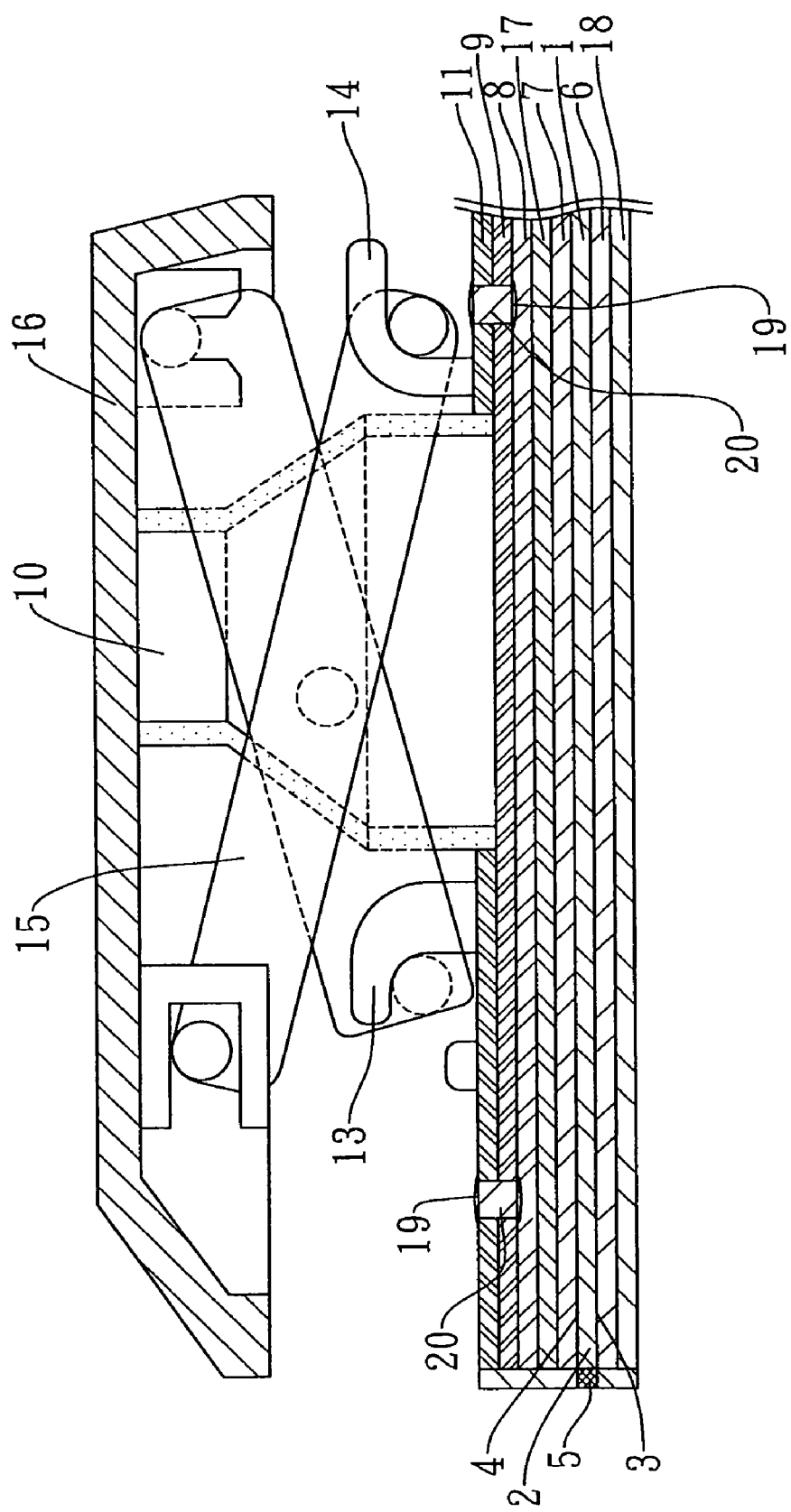
FIG. 2 is a sectional view of a light-emitting keyboard according to a preferred embodiment of the present invention.

FIGS. 1 and 2 representatively show an exploded view and a sectional view of a preferred embodiment of a light-emitting keyboard of the present invention. For illustration purposes, a person skilled in the art shall understand that a single key unit of the light-emitting keyboard illustrated in the drawings represents a group of similar key units on the keyboard. Modules similar to those equipped in a keyboard, such as top casing and bottom casing, are omitted for illustration purposes.

According to the present invention, there is provided a light-emitting keyboard, comprising: a light guide 1 having a light entrance surface 2, a bottom surface 3 adjoining to the light entrance surface 2 and a light exit surface 4 opposed to the bottom surface 3; a light source 5 provided on one side of the light entrance surface 2 of the light guide 1; a first reflector 6 disposed underneath the bottom surface 3 of the light guide 1; a second reflector 7 provided on top of the light exit surface 4 of the light guide 1; a reinforcement board 8 provided on top of the second reflector 7; a membrane circuit board 9 having an elastic member 10 provided on top of the reinforcement board 8; a supporting plate 11 having a first opening 12 provided on top of the membrane circuit board 9; and a scissor assembly 15 disposed on and engaged with the supporting plate 11 to support a keycap 16 provided thereon.

At least one lower end of the scissor assembly 1 5 is correspondingly connected to at least one first fixation bracket 13 and at least one second fixation bracket 14 configured on the supporting plate 11. At least one upper end of the scissor assembly 15 is engaged with the keycap 16 and preferably, at a bottom of the keycap 16. As an elastic member 10 may be further disposed on the membrane circuit board 9, said elastic member 10 may pass through the first opening 12 provided on the supporting plate 11 and the scissor assembly 15 respectively to engage with the keycap 16 and preferably with the bottom of the keycap 16. During operation, as the keycap 16 is pressed downwardly, the elastic member 10 may be elastically deformed to press or touch an electrical switch on the membrane circuit board 9 to generate or activate a corresponding signal.

In a preferred embodiment, a water-resistant layer 17 may be further provided on top of the second reflector 7 and preferably, it may be disposed between the reinforcement board 8 and second reflector 7 such that the light-emitting keyboard may be protected from infiltrated liquid which may damage components of the keyboard and cause short circuit.

According to a preferred embodiment of the present invention, the light source 5 is preferably provided on one side of the light entrance surface 2 of the light guide 1. In one embodiment, the light source 5 provided on one side of the light entrance surface of said light guide 1 may be at a lateral side of the light guide 1 and may be controlled and/or powered by a base circuit board 18; wherein said base circuit board 18 may be disposed underneath the light guide 1. In other words, it may be preferable that the light source 5 faces toward the light entrance surface 2 such that the light emitted from and by the light source 5 may reach the light entrance surface 2 directly. In another embodiment, the light source 5 provided on one side of the light entrance surface of said light guide 1 may be at a lateral side of the light guide 1 and may be controlled and/or powered by the membrane circuit board 9.

Referring to FIG. 2, at least one fastener 20 may be configured on the reinforcement board 8. In a preferred embodiment, said at least one fastener 20 may be formed integrally with the reinforcement board 8. Furthermore, at least one fastener aperture 19 may be provided on the membrane circuit board 9 as well as the supporting plate 11, allowing said fastener 20 of the reinforcement board 8 to pass therethrough correspondingly. Consequently, the membrane circuit board 9, the supporting plate 11 and the reinforcement board 8 can be secured altogether in a stack by having the fastener 20 of the reinforcement board 8 pass through the fastener apertures 19 of the membrane circuit board 9 and the supporting plate 11. In addition, in one embodiment, the at least one fastener 20 of the reinforcement board 8 may be a rivet. The reinforcement board 8 may be capable of stabilizing and reinforcing the overall structure of the keyboard, in particular, the structure of the membrane circuit board 9, the supporting plate 11, the scissor assembly 15 and the keycap 16.

The light originated from the light source 5 may enter the light guide 1 via the light entrance surface 2 thereof and then radiate out of or exit the light guide 1 via the light exit surface 4 thereof. The first reflector 6 may be provided underneath the bottom surface 3 of the light guide 1 to prevent the light emitted by the light source 5 from escaping from or out of the bottom surface 3 of the light guide 1 by reflecting said light towards the light exit surface 4 of the light guide 1. A portion of the light originated from or emitted by the light source 5 may penetrate or pass through said second reflector 7 disposed on top of the light exit surface 4 of the light guide 1 and then be radiated to reach the bottom of the keycap 16 such that the keycap 16 may be illuminated to a desired level. Furthermore, another portion of the light originated from the light source 5 may be reflected back towards the light exit surface 4 of the light guide 1 by the second reflector 7 such that, by doing so, the amount of the light that escapes to the surrounding or ambient environment may be reduced, and then the portion of the light may again be reflected or radiated in a desired direction, such as a vertical upward direction, towards the keycap 16 to illuminate the keycap 16 and further reinforce the luminescent efficiency. In short, in one embodiment, the first reflector 6 may be configured to be a total-reflector to reflect the light shone thereon while the second reflector 7 may be a semi-reflector or a total-reflector with a plurality of through-holes permitting portions of the light shone thereon to penetrate or pass through.

In a preferred embodiment, the light source 5 may face toward the light entrance surface 2 of the light guide 1 such that as the light emitted from and by the light source 5 enters the light guide 1 via the light entrance surface 2 thereof, a portion of the light that escapes from the bottom surface 3 of the light guide 1 may be reflected upward by the first reflector 6 and then be radiated out of the light guide 1 via the light exit surface 4 thereof to illuminate the keycap 16. According to a preferred embodiment of a light-emitting keyboard of the present invention, it may be understood that the light originated from the light source 5 and entering the light guide 1 via the light entrance surface 2 may travel in a vertical upward direction passing through the components and structures configured between the first reflector 1 and the keycap 16, including the light guide 1, the second reflector 7, the water-resistant layer 17, the reinforcement board 8, the membrane circuit board 9, the supporting plate 11 and the scissor assembly 15. In addition, it may be understood that the configuration and arrangement of the components may be varied in terms of their sequential order, combination and/or quantity. In an exemplary embodiment, the water-resistant layer 17 may be disposed above the second reflector 7; whereas in another preferred embodiment, it may be disposed underneath the second reflector 7 depending on the design and configuration desired.

Figure 3:
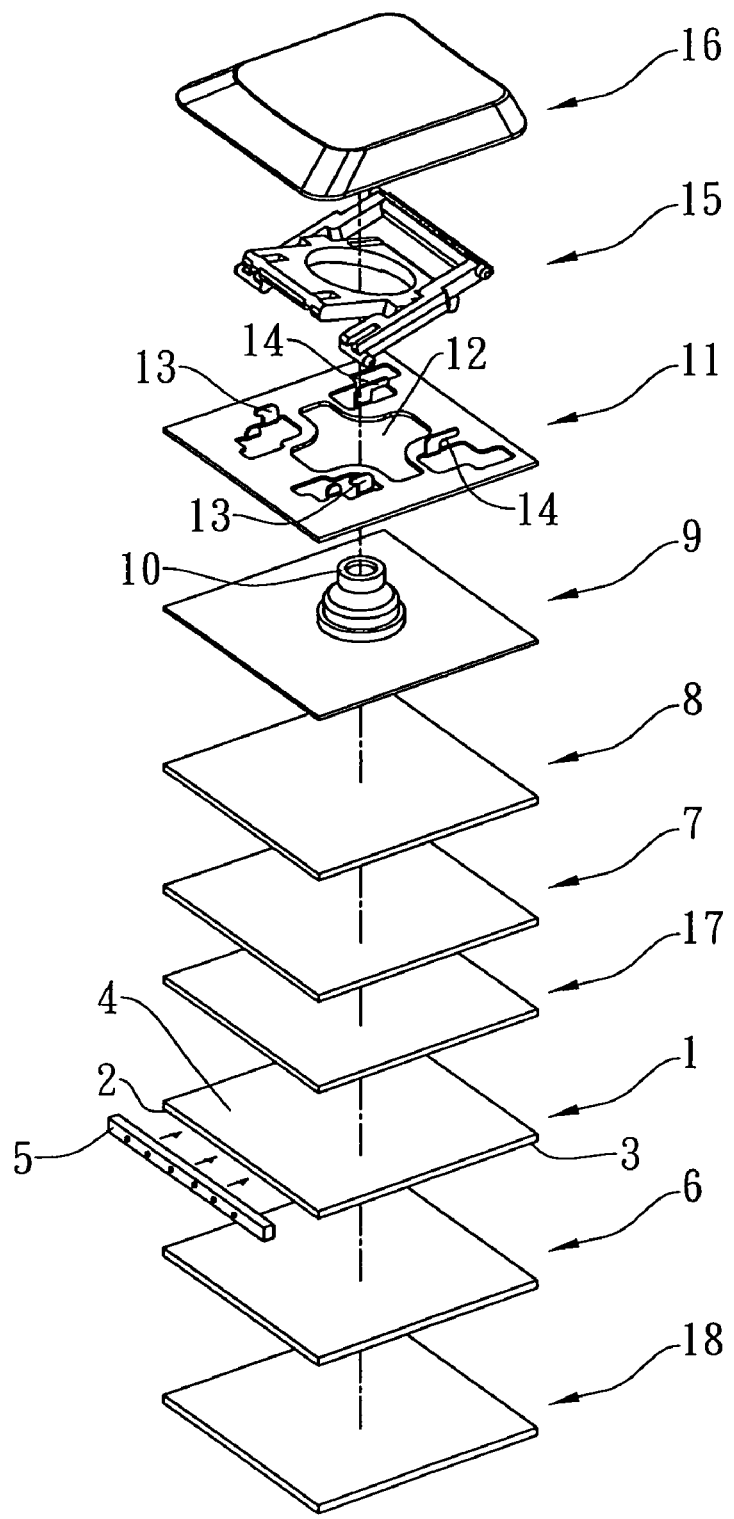
FIG. 3 is an exploded view representing a light-emitting keyboard according to another preferred embodiment of the present invention.

FIG. 3 is a sectional view of another preferred embodiment of the present invention. The light-emitting keyboard of the embodiment shown may have a different arrangement of the component such as the abovementioned water-resistant layer 17. In a preferred embodiment, the water-resistant layer 17 may be disposed between the second reflector 7 and light guide 1 such that it may protect the light-emitting keyboard from infiltrated liquid. Again, it is to be understood that variations may be made to the quantity, combination and sequential order of the layer.

Merits of the Present Invention

Merits of the present invention may be summarized as follows; however, it can be understood that the merits recited herein are to better illustrate the technical features of the present invention and shall not be construed as a limitation to the present invention.

1. More secure and stabilized structure with an ease for assembly of the structure: The lower end(s) of the scissor assembly may be engaged or secured to the first and second fixation brackets of the supporting plate with an ease by various methods, such as movably sliding and withholding, during the process of assembly, in accordance with one embodiment of the configuration of said fixation brackets recited above and shown in the figures. Similarly, the upper end(s) of the scissor assembly may be engaged or secured to the bottom of the keycap with an ease. Consequently, less modification to the membrane circuit board disposed underneath the supporting plate is required as the supporting plate, the scissor assembly and the keycap are securely and directly connected to each other, and this may significantly reduce the design and manufacturing costs of the keyboard, in particular, the membrane circuit board. Furthermore, according to one embodiment of the present invention, the abovementioned reinforcement board may include fasteners such as rivets but not limited to rivets as a number of types of fasteners are applicable as well, thereby the scissor assembly, the supporting plate and the reinforcement board may be secured together in a stack, providing a more secure and stabilized structure.

2. Better luminance capability: As the first reflector and the second reflector are provided underneath and on top of the light guide respectively, the reflection and retroreflection of the light originated from the light source and entering the light guide may be enhanced such that the amount of the light escaping to the surrounding or ambient environment may be reduced and the luminance received by or reaching the keycap may increase and be more evenly distributed.

3. Better protection: According to a preferred embodiment of the present invention, the adoption of the water-resistant layer in the keyboard may provide a better protection to the keyboard and protect it from infiltrated liquid which may cause unfavorable short circuits to the keyboard.

While this invention has been described by way of examples and in terms of preferred embodiments, it is to be understood that this invention is not limited hereto, and that various changes, substitutions, and alterations can be made herein without departing from the spirit and scope of this invention as defined by the appended claims. Please refer to the claims for the coverage of the rights of the present invention. Furthermore, phrases such as "a", "an" and "one" recited herein may denote the phrase "a plurality of" and shall be treated as a limitation as the combination and configuration of the structure may be varied in terms of quantity as explained in the above content.

What is claimed is:

1. A light-emitting keyboard, comprising:
   a light guide having a light entrance surface, a bottom surface and a light exit surface;
   a light source provided on one side of the light entrance surface of the light guide;
   a first reflector disposed underneath the bottom surface of the light guide to reflect light originated from the light source to enter into said light guide;
   a second reflector disposed on top of said light exit surface of the light guide;
   a membrane circuit board disposed on top of said second reflector, said membrane circuit board being provided with an elastic member;
   a supporting plate disposed on top of the membrane circuit board, said supporting plate further including a first opening corresponding to the elastic member of the membrane circuit board;
   a scissor assembly engaged with said supporting plate and provided thereon;
   a keycap supported by and disposed on top of said scissor assembly; and
   wherein said first reflector provided underneath the bottom surface of the light guide prevents the light emitted by the light source from escaping from the bottom surface of the light guide by reflecting said light towards the light exit surface of the light guide; and said second reflector permits a portion of the light originated from the light source to penetrate therethrough and reflects another portion of the light originated from the light source back towards the light exit surface of the light guide;
   wherein a reinforcement board having at least one fastener is further provided on top of the second reflector.

2. The light-emitting keyboard according to claim 1, wherein at least one fastener aperture is configured on the membrane circuit board and the supporting plate respectively to allow said at least one fastener of the reinforcement board to pass therethrough such that the reinforcement board, the membrane circuit and the supporting plate may be secured in a stack.

3. The light-emitting keyboard according to claim 1, wherein said light source provided on one side of the light entrance surface of said light guide is at a lateral side of the light guide and controlled by a base circuit board.

4. The light-emitting keyboard according to claim 1, wherein said light source provided on one side of the light entrance surface of said light guide is at a lateral side of the light guide and controlled by said membrane circuit board.

5. The light-emitting keyboard according to claim 1, wherein the light entrance surface and the bottom surface of the light guide adjoin to each other and the bottom surface is opposed to the light exit surface thereof such that the light originated from the light source enters at the light entrance surface of the light guide and radiates out of the light guide via the light exit surface thereof.

6. The light-emitting keyboard according to claim 1, wherein said scissor assembly is engaged with said supporting plate by having at least one lower end of said scissor assembly engaged correspondingly with at least one first fixation bracket and at least one second fixation bracket configured on said supporting plate and by having at least one upper end of said scissor assembly engaged with the keycap.

7. The light emitting keyboard according to claim 1, wherein said elastic member passes through the first opening of the supporting plate and the scissor assembly to engage with the keycap.

8. A light-emitting keyboard, comprising:
  a light guide having a light entrance surface, a bottom surface and a light exit surface;
  a light source provided on one side of the light entrance surface of the light guide;
  a first reflector disposed underneath the bottom surface of the light guide to reflect light originated from the light source to enter into said light guide;
  a second reflector disposed on top of said light exit surface of the light guide;
  a membrane circuit board disposed on top of said second reflector, said membrane circuit board being provided with an elastic member;
  a supporting plate disposed on top of the membrane circuit board, said supporting late further including a first opening corresponding to the elastic member of the membrane circuit board;
  a scissor assembly engaged with said supporting plate and provided thereon;
  a keycap supported by and disposed on top of said scissor assembly; and
  wherein said first reflector provided underneath the bottom surface of the light guide prevents the light emitted by the light source from escaping from the bottom surface of the light guide by reflecting said light towards the light exit surface of the light guide; and said second reflector permits a portion of the light originated from the light source to penetrate therethrough and reflects another portion of the light originated from the light source back towards the light exit surface of the light guide;
  wherein a water-resistant layer is further provided on top of said second reflector.

9. A light-emitting keyboard, comprising:
  a light guide having a light entrance surface, a bottom surface and a light exit surface;
  a light source provided on one side of the light entrance surface of the light guide;
  a first reflector disposed underneath the bottom surface of the light guide to reflect light originated from the light source to enter into said light guide;
  a second reflector disposed on top of said light exit surface of the light guide;
  a membrane circuit board disposed on top of said second reflector, said membrane circuit board being provided with an elastic member;
  a supporting plate disposed on top of the membrane circuit board, said supporting plate further including a first opening corresponding to the elastic member of the membrane circuit board;
  a scissor assembly engaged with said supporting plate and provided thereon;
  a keycap supported by and disposed on top of said scissor assembly; and
  wherein said first reflector provided underneath the bottom surface of the light guide prevents the light emitted by the light source from escaping from the bottom surface of the light guide by reflecting said light towards the light exit surface of the light guide; and said second reflector permits a portion of the light originated from the light source to penetrate therethrough and reflects another portion of the light originated from the light source back towards the light exit surface of the light guide;
  wherein a water-resistant layer is provided underneath the second reflector.

\* \* \* \* \*